United States Patent [19]

Tatarchuk et al.

[11] Patent Number: 5,080,963
[45] Date of Patent: Jan. 14, 1992

[54] MIXED FIBER COMPOSITE STRUCTURES HIGH SURFACE AREA-HIGH CONDUCTIVITY MIXTURES

[75] Inventors: Bruce J. Tatarchuk; Millard F. Rose; Aravamuthan Krishnagopalan; John N. Zabasajja; David A. Kohler, all of Auburn, Ala.

[73] Assignee: Auburn University, Auburn University, Ala.

[21] Appl. No.: 356,861

[22] Filed: May 24, 1989

[51] Int. Cl.⁵ .................... D04H 1/04; H01M 4/72
[52] U.S. Cl. .................... 428/225; 204/242; 204/252; 204/294; 264/61; 428/288; 428/293; 428/296; 428/303; 428/311.1; 428/401; 428/539.5; 428/608; 428/408; 428/902; 429/234; 429/235

[58] Field of Search ........... 428/225, 293, 457, 539.5, 428/545, 608, 288, 296, 311.1, 303, 401; 427/121; 264/60, 61, 63; 204/242, 252, 254, 282, 290 R, 294; 429/234, 235

[56] References Cited

U.S. PATENT DOCUMENTS

| | | | |
|---|---|---|---|
| 3,341,446 | 9/1967 | Vielstich et al. | 210/503 |
| 3,657,014 | 4/1972 | Faber | 429/234 X |
| 3,905,831 | 9/1975 | Brown et al. | 136/86 |
| 3,973,059 | 8/1976 | Brown et al. | 427/180 |
| 4,115,528 | 9/1978 | Christner et al. | 423/449 |
| 4,394,244 | 7/1983 | Divisek et al. | 204/295 |
| 4,448,856 | 5/1984 | Zuckerbrod et al. | 429/27 |
| 4,456,521 | 6/1984 | Solomon et al. | 204/292 |
| 4,500,647 | 2/1985 | Solomon | 502/101 |
| 4,506,028 | 3/1985 | Fukuda et al. | 502/101 |
| 4,518,705 | 5/1985 | Solomon | 502/101 |
| 4,597,028 | 6/1986 | Yoshida et al. | 361/305 |
| 4,643,940 | 2/1987 | Shaw et al. | 428/308.4 |
| 4,737,889 | 4/1988 | Nishino et al. | 361/433 |
| 4,743,349 | 5/1988 | Bachot et al. | 204/242 |
| 4,882,227 | 11/1989 | Iwase et al. | 428/407 |
| 4,944,991 | 7/1990 | Karas et al. | 428/408 |

FOREIGN PATENT DOCUMENTS 0074263  3/1983  European Pat. Off. ............ 428/608

OTHER PUBLICATIONS

Watanabe and Coworkers, *J. Electrochem. Soc: Electrochemical Science and Technology*, 134, 1318 (1987).

Primary Examiner—George F. Lesmes
Assistant Examiner—Christopher Brown
Attorney, Agent, or Firm—Eugene I. Snyder

[57] ABSTRACT

A new class of composites results from a matrix of carbon fibers, including graphite fibers, interwoven in a network of fused metal fibers. The composites can be fabricated to have varying surface area, void volume, and pore size while maintaining high electrical conductivity. Composites are readily prepared from a preform of a dispersion of carbon fibers, metal fibers, and an organic binder such as cellulose, by heating the preform at a temperature sufficient to fuse the metal fibers and to volatilize at least 90% of the binder with a loss of less than about 25%, and usually under 10%, by weight of carbon fiber.

27 Claims, 7 Drawing Sheets

MIXED FIBER COMPOSITE STRUCTURES HIGH SURFACE AREA-HIGH CONDUCTIVITY MIXTURES

ACKNOWLEDGEMENTS

This work was funded by Auburn University and the Space Power Institute as funded by the SDIO Innovative Science and Technology Office and the Defense Nuclear Agency under DNA contract no. 001-85-C-0183. The authors wish to express their gratitude to Mr. Ray Cocco for assistance in SEM studies, to Mr. H. Patel for assistance with XPS measurements, and to Dr. Y. J. Kuo.

BACKGROUND OF THE INVENTION

This application relates to novel composites having high surface area, variable porosity and void volume, good conductivity, and displaying chemical stability in corrosive environments. The composites have mechanical and structural integrity and can be prepared in virtually an endless variety of shapes. For the sake of simplicity and clarity of exposition, the composites which are our invention will be discussed from the aspect of their use as electrode materials. However important this particular application may be, it needs to be stressed at the outset that the claimed composites have significant utility outside the field of electrochemistry, but such uses are omitted here only for convenience.

Carbon based electrodes are currently used in many high energy density and/or high power density applications, such as $Li/SOCl_2$ batteries, liquid double layer capacitors, and fuel cells. The maximum energy and power densities obtainable from these devices depend upon various physicochemical rate phenomena occurring at the electrode-electrolyte interface. For example, in the case of high energy density lithium/thionyl chloride batteries, deactivation of the carbon cathode limits operation of the battery at high ($>10$ mA/cm$^2$) discharge rates. Since deactivation arises from the preferential precipitation of solid reaction products at the exterior of the cathode, thereby blocking its interior from participating in the reaction, the power density of the battery during discharge is limited by the porosity, the void volume, and the active or accessible surface area of the carbon cathode.

As previously stated, the low solubility of cell reaction products at the cathode severely limits operation at high discharge rates when precipitates form at the exterior surface of the cathode, blocking its interior surface area from hosting products of the cell reaction. When the cathode becomes blocked, the interfacial electrochemical reaction of the anode becomes limited by the dissolution rate of the reaction products into the electrolyte, which in turn is controlled by the precipitation rate at the cathode. Attempts to improve the fabrication and design of the carbon cathode has had limited success. Much of this activity has involved the addition of metallic elements such as copper to the carbon or the coating of the cathodes with transition metal phthalocyanines. Other efforts have utilized various carbon pretreatment procedures or different types of carbon blacks with various physical properties. However, past attempts appear not to address the intrinsic problem associated with carbon blacks, viz., the inaccessibility of small pores within the microstructure of the material and the existence of low void volumes in the outermost layers of the carbon. To provide high power density cathodes what is needed are materials which are flexible, have high specific surface areas, have varying and adjustable porosities and void volumes to accommodate reaction products as precipitates without significant loss of surface area, and which are corrosion resistant.

In liquid double layer capacitors the energy density increases with increased active surface area of the electrode presented to the electrolyte. On the other hand, the power density is controlled and limited by slow diffusion of electrolyte through the microporous electrode material. The combined energy and power density of these capacitors is the resultant of increased diffusion processes, which prefer large pores and high void volumes, and higher levels of specific surface area, which require small pore sizes and low void volumes. To date the requirements of large pores/high void volume and high surface area tend to be mutually exclusive. Consequently, since increased energy density involves increased surface area and increased porosity, power dense devices become more and more limited by diffusion processes as the surface area of the electrode is increased.

In fuel cells, an effective electrode material should exhibit high catalytic activity and high electrical conductivity to minimize joule losses within the device. The electrode should be highly porous to provide free access to both the gases and the electrolytes. The optimum pore size distribution of the electrode material is a compromise between several factors. For high strength, low porosity and small pores are desirable. For low polarization, large pores with maximum internal surface area are more desirable. Electrodes also contain metals such as platinum, nickel, and so forth, which are good catalysts for fuel oxidation and oxidant reduction. The catalytic activity depends on the active surface area of electrode as well as the contacting of the electrode with reactants consisting of fuel and electrolyte. For this reason, controlled wetting of the electrode poses one of the more severe design limitations confronting the device in order to provide optimal contacting at the gas-liquid-catalyst interface in the absence of weeping, bubbling, and flooding.

Carbon is an especially attractive electrode material, and high surface area carbon electrodes typically are fabricated with carbon black. However, a major difficulty in fabricating and utilizing high surface area carbon electrodes has been in physically supporting the carbon. Carbon black usually is used in the powdered form which cannot be easily supported unless poly(tetrafluoroethylene) (PTFE) or other types of binders are used. Our radically different approach has been to combine dissimilar and normally incompatible materials to form a physically stable composite structure which exhibits properties intermediate to the constituent materials. In the context of carbon electrodes, the resulting materials have a high surface area, variable porosity and variable void volume, are structurally stable, and can be fabricated in a virtually endless variety of shapes and sizes. More particularly, high surface area carbon fibers and highly conductive metal fibers have been combined in an interwoven sinter-locked network or grid which is structurally stable. The resultant high surface area and conductive composite allows high accessibility to gases and electrolytes while providing adjustable porosities and void volumes. Interlocked networks of thin fibers can be bonded to metallic backings to provide flexible electrode structures which can be readily assembled into devices even when one of the components is relatively brittle.

A generic approach to high surface area has been to disperse carbon blacks in an organic resin which serves as a mechanical framework. Solomon in U.S. Pat. No. 4,500,647 exemplifies one approach by using a matrix of carbon particles within an unsintered (i.e., unfused) network of carbon black-filamentary PTFE. The use of PTFE as a matrix for carbon particles has been investigated extensively. However, the addition of PTFE reduces the electrical conductivity of the cathode active layer (Solomon et. al. in U.S. Pat. Nos. 4,500,647, 4,518,705, 4,456,521) and the cost of using PTFE has led others to seek alternative means of holding the carbon black together (Aubrey D. Smith, National Technical Information Service Technical Note, Report Date—February, 1986, 1 page, NTN86-0166).

A somewhat different approach employs carbon particles in a carbonized matrix. For example, Christner et. al. (U.S. Pat. No. 4,115,528) prepare a porous carbon sheet by coating carbon fibers with furfuryl alcohol and a catalyst effective for its polymerization. The mixture was formed into a mat, heated to effect polymerization, and the resin then was further heated to carbonize the resin. The patentee in U.S. Pat. No. 4,506,028 dispersed carbon fibers in an organic binder containing organic poreforming granules, then heated the mix to carbonized the binder and volatilize the poreformers. In both of the foregoing the carbonized matrix supplies structure (i.e., rigidity and mechanical strength), whereas in our composites structure is afforded by a grid of fused metal fibers.

Zuckerbrod et. al. in U.S. Pat. No. 4,448,856 describes an electrode with a layer of paste consisting of carbon particles, stainless steel particles, a fluorinated polymeric binder, and a catalyst for decomposition of peroxides. It is noteworthy that such a paste must contain at least 20 weight percent stainless steel relative to carbon particles. Finally, Watanabe and coworkers, [J. Electrochem. Soc: Electrochemical Science and Technology, 134, 1318 (1987)] used polyethylene glycol as a binder for carbon blacks, then pressed a film of the resulting material on nickel wire for use as a cathode in a lithium cell. It may be mentioned in passing that electrochemical electrodes have been described in U.S. Pat. No. 3,905,831 consisting of a pile fabric where a portion of the yarn is metallic. The patentees mention that the metal fibers in the yarn may be bonded, as by sintering, brazing or welding.

DESCRIPTION OF THE INVENTION

Figure 1:
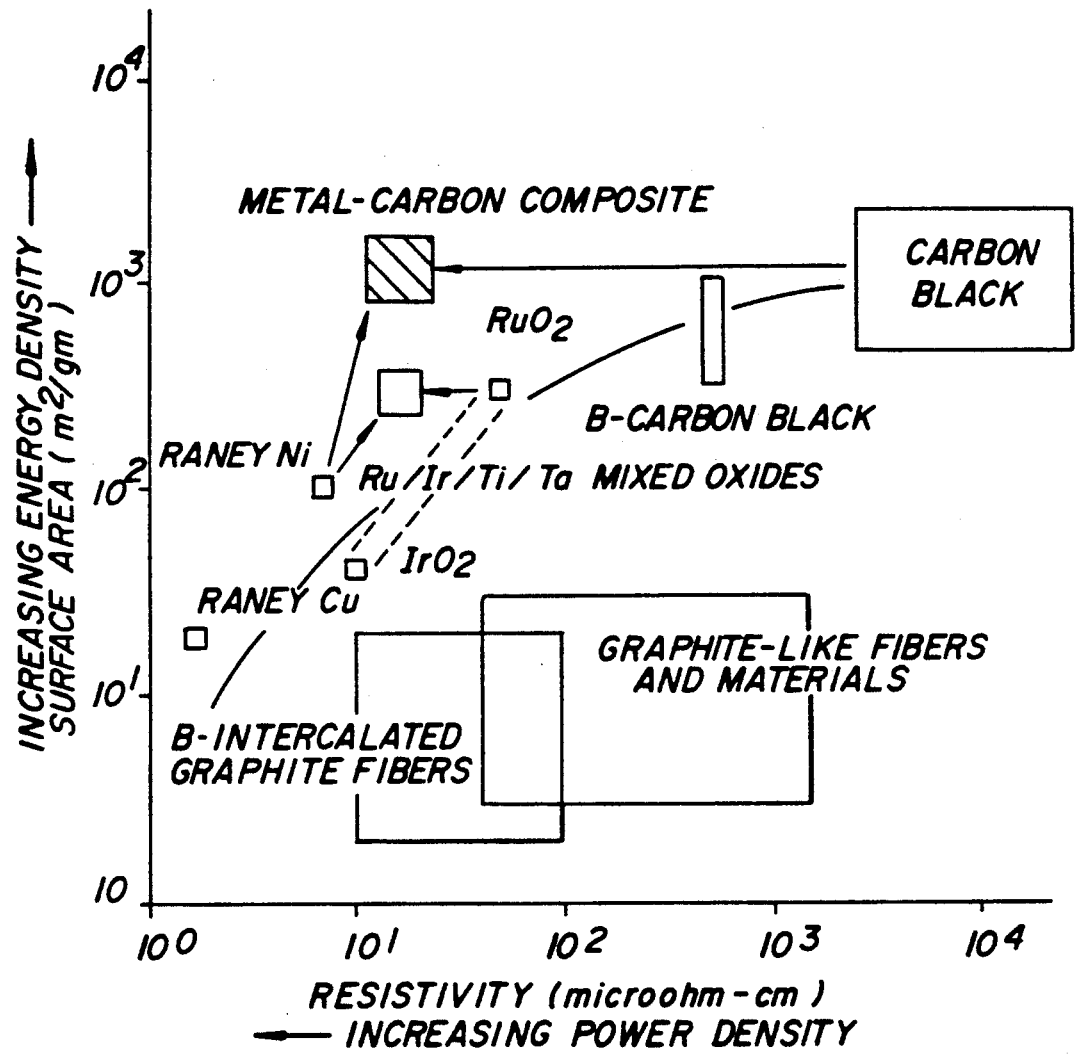
FIG. 1 shows how resistivity changes with surface area for various materials.

In the sphere of electrodes it often is desired that materials have a high surface area, high void volume, and high electrical conductivity. Although it is not necessary that all three attributes be manifested simultaneously in every physical device utilizing an electrode, it would be quite desirable to have an electrode material which not only permits variability in these properties, but also affords the option of preparing an electrode with that set of properties optimum for a particular application. Properties such as high surface area and high electrical conductivity tend to be mutually exclusive, as is illustrated in FIG. 1. This situation arises because, for example, carbon has a low density (relatively high surface area) and modest conductivity whereas metals have a high density (relatively low surface area) accompanied by a generally high conductivity. Consequently, the properties of prior art materials, and in particular the mutual exclusivity of two of the three properties given above, restrict the set of simultaneously attainable properties available and preclude the option of complete design manipulation.

Conceptually a marriage of carbon and metals might result in a composite with the best features of both. However, carbon blacks and metals do not form strongly adhesive bonding arrangements with each other and possess quite different densities and tensile properties. Consequently they do not mix well when dry nor provide good adherence to metal substrates under normal conditions. As previously stated, our goal has been to combine dissimilar and normally incompatible materials to form a physically stable composite structure which exhibits properties that are intermediate to the constituent material. This goal has been achieved successfully in the inventions which are described within. One embodiment is a composite which is a matrix of carbon fibers interwoven or interlocked in a network of fused metal fibers. Another embodiment is an electrode of the aforementioned composite bonded to electrically conducting material. Yet another embodiment is a preform for the composite comprising a dispersion of carbon fibers, metal fibers, and an organic binder where at least 99% of the latter is converted to volatile materials under conditions sufficient to fuse the metal fibers with a loss of less than 15 weight percent carbon. Yet another embodiment is a method of making the composite comprising preparing a uniform dispersion of carbon fibers, metal fibers, and solid cellulosic binder in a liquid medium, collecting the wetted uniform solid dispersion and removing the liquid medium from it to afford a preform, heating the preform in a gaseous atmosphere at conditions sufficient to vaporize at least 99% of the binder and to fuse metal fibers with a weight loss of less than 15% of carbon fibers, and recovering the resulting composite.

As stated above, the composite of this invention is a matrix of carbon fibers interlocked in and interwoven among a network of fused metal fibers. Although it should be apparent that "carbon" in the phrase "carbon fibers" includes and encompasses graphite, we here specifically note that in the context of the remainder of this specification and in the claims "carbon fibers" includes graphitic material. The carbon fibers contitute from about 1 to about 98 weight percent of the final composite, although the range between about 20 to about 98 weight percent is preferred. There is no significant upper or lower limit for the diameter of the carbon fibers as regards the composite itself. That is, the diameter of the carbon fibers used in the composite influences its final properties rather than imposing limitations on the composite itself. Carbon fibers have been reported with a surface area from about 1500 m$^2$/g to 1 m$^2$/g and less, and with a diameter from 20 nm to about 1 nm. As an example, and as will become clearer from the descriptions within, for use in liquid double layer capacitors, $H_2/H_3PO_4/O_2$ fuel cells, and $Li/SoCl_2$ batteries, carbon fibers having a surface area of from 250 m$^2$/g to about 1000 m$^2$/g is most desirable with fibers having a diameter from 1 to about 10 microns, with a carbon content of the composite ranging from 30 to about 90 weight percent.

The carbon fibers generally are present as bundles. Single fibers tend to be brittle, whereas bundles or aggregates of fibers afford a composite with more desirable mechanical properties. As the diameter of the carbon bundles increases, the weight of metal fibers needed to keep the bundles interwoven or interlocked is decreased. The physical properties of the final composite also depend on the physical properties of the carbon fibers used; thermal stability, surface area, mean pore diameter, mechanical flexibility, resistance to electrolytes and acids, and electrocatalytic properties are examples of composite properties which are influenced by the properties of the constituent carbon fibers and any electroactive materials impregnated on the fibers. It should be emphasized that the surface area of the carbon fibers used largely determines the surface area of the final composite. Since different applications require different characteristics, the choice of carbon fiber properties often will be dictated by composite application. For example, where used in double layer capacitors one generally wants a certain minimum pore size, which in turn limits the surface area. In batteries mass transfer is more important and one wants a higher void volume, preferably with a bimodal pore size distribution. A graded porosity also is possible to attain using this invention and may be important in particular applications. However, what needs to be emphasized is that many of the composite properties are not only variable but are under the control of the investigator or fabricator within quite broad and flexible limits.

The carbon fibers are interwoven among, and interlocked in, a network of metal fibers. The metal fibers which may be used in the practice of this invention must be electrically conducting when used in an electrode, must be chemically inert under the conditions of their contemplated use, and must provide structural integrity and mechanical stability to the final composite under the contemplated conditions of use. So, for example, the final composite generally needs to retain its overall shape, and to retain the carbon fibers in the network relatively rigid and immobile. Examples of metal fibers which may be used in the practice of this invention include aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, beryllium, iridium, silicon, and combinations of the above. Metal alloys also may be used in the practice of this invention, as exemplified by constantan, hastelloy, nichrome, inconel, monel, carpenter's metal, and various steels, especially stainless steels, and other iron alloys. As can be appreciated, there is enormous flexibility in the choice of metal fibers. Because of their general availability and relatively modest cost, as well as favorable physical and chemical properties, various stainless steels are the materials of choice, especially in many electrode applications.

The diameter of the metal fibers used is largely dictated by their availability. Although in principle there is no upper or lower limit to metal fiber diameter there may be significant operational restrictions. For example, if the metal fiber diameter is greater than ten times, or less than one-tenth, the carbon fiber diameter, then the fused metal network may not hold the carbon fibers together adequately. Stated differently, the metal fiber diameter $D_m$ relative to the carbon fiber diameter $D_c$ is in the range $0.1\ D_m \leq D_c \leq 10\ D_m$. Another operational limitation is related to the number of metal-metal contacts, or fusion points, which are largely responsible for supporting the carbon fibers in the composite. Calculations show that the number of metal-metal contacts varies inversely with the square of the metal fiber diameter, hence there is a requirement for small diameter metal fibers where it is desirable to increase the overall weight fraction of carbon and surface area of the resulting composite. But in the context of novel composites per se, the diameter of the metal fiber used is not critical. The method of preparation and attainment of composites is not limited by metal fiber diameter, at least up to about 50 microns. In the context of composite properties, however, the diameter of the metal fiber is important. In practice it is desirable to have metal fibers with a diameter under about 10 microns. It would be most desirable to use metal fibers with a diameter in the range from about 0.5 microns to about 4 microns, but it needs to be emphasized again that the nature and diameter of the metal fibers used in the practice of this invention are limited largely by their availability rather than by any theoretical considerations.

The amount of metal in the final composite depends on how much surface area per gram is important, and, perhaps even more importantly, how good a contact is desired between the metal and the carbon fibers. It should be clear that the better the contact wanted, the higher the necessary percentage of metal fiber (at constant fiber diameter) in the final composite. Generally the composites of this invention will have a metal content ranging from about 2 up to about 99 weight percent. As metal content increases, the composite shows reduced resistance and higher power density per gram with a lower surface area and lower energy density per gram.

The carbon and metal fibers are mixed with a binder to afford a preform, which is a solid containing a nonwoven dispersion of the fibers. The binder provides a matrix in which the fibers of the carbon and metal are dispersed. The purpose of the binder is to permit the fabrication of a solid preform containing an otherwise structurally unstable dispersion of the elements of the final composite, —i.e., carbon and metal fibers—which can be shaped, stored, and otherwise handled prior to creation of an interlocked network via fusion of the metal fibers. The binder merely provides a stable, although weak, physical structure which maintains the spatial relationship of the components of the final composite prior to the latter's formation. Although the preform is only a temporary structure, it is an important one in the fabrication of the final composite. The binders used in preparation of the preform also may contain adjuncts, such as pore and void formers.

One critical property of the binders which may be used in the practice of this invention is that they volatilize at least to the extent of 90 weight percent, and preferably at least 99 weight percent, under conditions used for fusion of the metal fibers. The binder has no function in the composite, hence its presence should be minimal. Among binders which may be used in the practice of this invention are cellulose, organic resins such as polyvinyl alcohols, polyurethanes, and styrene-butadiene latex, and thermosets such as epoxies, urea-formaldehyde resin, melamine-formaldehyde resin, and polyamide-polyamine epichlorohydrin resin. Cellulose appears to be the premier binder because it volatilizes completely at relatively low temperatures with little ash formation and is unreactive toward the other components of the composite.

The binder is present in the preform at a range from about 2 up to about 80 weight percent. The minimum amount of binder is that which is necessary to give a stable preform, that is, one which can be handled, shaped, and so forth, an amount which depends upon carbon fiber loading, fiber size, and so forth. The amount of binder present in the preform will influence the void volume of the final composite, with a higher binder content affording a higher void volume, hence the binder can be used as one independent variable to control this property. Using cellulose with carbon fibers and stainless steel fibers as an example, a range from about 10 to about 60 weight percent of cellulose is a typical one.

The carbon and metal fibers are mixed with the binder and with a liquid of appropriate viscosity. The purpose of the liquid is to provide a medium for the facile and effective dispersion of the solids, for one wants as uniform a dispersion as is feasible in the final preform. Other than the need for the liquid being unreactive with the components, there are no other important limitations on the liquid which may be used. In the case of cellulose water normally will be the liquid, although water-alcohol mixtures, especially water-glycol, may be used. Illustrative examples include methanol, ethanol, propanol, ethylene glycol, propylene glycol, butylene glycol, poly(ethylene glycol)s, poly(propylene glycol)s, and so forth. The liquid medium also may contain salts where desirable.

After a dispersion is attained, the solids are collected, as on a mat. Excess liquid may be removed, such as by pressing, and the resulting solid dispersion is then dried. Where a thermosetting binder is used the temperature of drying is important. However, in the more usual case there is nothing particularly critical in the drying process, and drying may be performed in air, under elevated temperatures, or in a flowing gas. The mass also may be compacted to a greater or lesser extent to affect void volume; the greater the compaction, the lower will be the void volume.

Fusion or sintering of the metal fibers in the dried preform, whose preparation was described above, is the final stage in the fabrication of the composite. The preform is heated under conditions effecting sintering of the metals to provide a network of fused metal fibers. Fusion of the metal fibers at their points of contact rigidly locks the carbon fibers in place to afford a rigid structure by defining a matrix of carbon fibers interwoven or interlocked in a network of metal fibers with the structural rigidity arising from a multiplicity of fused points of contact. Sintering typically is done in a gas containing hydrogen at a partial pressure which is about 5 times the partial pressure of water in the gas stream, the water typically arising from the binder and from oxides on the surface of the metal. At the temperature of metal fusion the metal also usually promotes gasification of carbon via its reaction with hydrogen to afford methane. Consequently sintering preferably is performed at a high temperature for a short time to promote metal fusion relative to carbon gasification. It is desired that sintering be accompanied by loss of less than about 25% by weight of the carbon fibers via gasification, preferably under about 15%, and even more preferably under about 5 weight percent loss. Although the nature of the materials in the perform are important to determine the particular fusion conditions, the relative amounts of these materials are less important. The optimum sintering temperature can be routinely determined by the skilled worker in this field through simple experimentation. For example, where a carbon fiber-stainless steel composite is obtained through a preform with cellulose as a binder it has been determined that fusion temperatures from about 1000° C. to about 1200° C. for a period from 2.5 minutes to 3 hours is optimum in an atmosphere of $H_2$ at 101 KPa. It may be noted in passing that controlled void formation is a consequence of binder volatilization.

It needs to be appreciated that although the foregoing temperatures provide a workable range, the properties and composition depend on the sintering time and temperature. Sintering at 1200° C. for 5 minutes produces an electrode material very different than one formed using the same preform and sintering at 1000° C. for 3 hours. Depending on the specific application, either one might be considered optimal. Certainly the corrosion resistance of the metal and the metal/carbon ratio are greatly affected by the sintering conditions shown. The polarization resistance also depends on the conditions.

As stated at the outset, the properties of the composite may be varied over rather wide ranges. The surface area of the composite depends upon the amount of carbon present as well as the surface area of the carbon fibers used in its preparation. It is desirable to have a composite with a high surface area where the composite is used as an electrode, but with a low surface area where the composite is used for electromagnetic sheilding. The surface area of the final composite may range from about 0.001 $m^2/g$ to at least 1350 $m^2/g$. In the general field of electrochemistry, the most interesting range of surface areas is from about 50 to about 1350 $m^2/g$, especially the range 250-1000 $m^2/g$. The void volume of the composite determines its ability, when used as an electrode, to accommodate solid precipitates without affecting electrode surface area, and the ability to provide good heat and mass transfer. Void volume, as mentioned above, may be adjusted by the amount of the binder used, as well as the diameter of the binder fibers and the application of pressure during sintering. Clearly this is under the control of the investigator who then has the capability of fabricating composites with that set of properties desired for a specific application.

In the case of bipolar electrodes, required for liquid double layer capacitors, $Li/SOCl_2$ cathodes and $H_2/H_3PO_4/O_2$ fuel cells, preform materials are placed on both sides of a thin metal foil and sintered, as described earlier, so that the metal fibers lock the high surface area carbon fibers to both sides of the electrode foil. The metal foil serves as an electrolyte barrier and an electrode base for connecting external contacts. Metal fibers and the electrode base may be fabricated from the same material, although dissimilar metals can be used provided highly adherent and sinter-bonded contacts can be formed.

As stated earlier, the composites of our invention have a multiplicity of diverse uses in addition to that of an electrode. For example, the composite paper preforms can be stacked and sintered with varying pore sizes, void volumes, etc., so as to form tailored filter materials. These filter materials can be wrapped around an appropriate mandrel so that near net shape properties are obtained upon sintering. There does not appear to be any major limitation on the fiber materials which are used. The independent adjustment of pore size and void volume would help to make, e.g., stainless steel filters, which provide long lifetimes and lower pressure drops prior to plugging.

Superconducting magnetic separators, with appropriate screen materials, are routinely used in the mineral beneficiation industry to remove magnetic ores and particulates from nonmagnetic crudes. The force which attracts the magnetic particulate depends upon a number of factors one of which is the magnitude of the magnetic field gradient at the magnetic screen. Material holdup and retention, and clogging prior to demagnetization with shaking and rinsing also are design criteria.

In the past, methods have not existed for making screen materials with independent optimization of void volume, pore size and fiber diameter. Fiber diameter is important since the radius of the wire and holes or voids in the resultant mesh control the magnetic field gradient. Currently, 400 grade stainless steels with appropriate magnetic properties are employed in these screens, but fibers below 10 or 20 μm are generally not used since the screen or mesh which is formed plugs easily due to the formation of small voids and/or becomes weak when small diameter materials are employed if the voids are kept large (viz., low density materials).

Our process (i) is directly applicable to 400-grade stainless steels, (ii) can be used to achieve relatively independent control of void volume and pore volume, (iii) can fuse small diameter loose fibers into networks that are not available as freestanding starting materials, (iv) can be used to form layered/stacked sheets for graded porosities and enhanced performance and (v) can utilize mixtures of both large and small diameter fibers. The latter approach would permit larger fibers to be used for structural support while high gradient zones could be affixed to these members using smaller diameter materials. Indeed, the possibilities here seem endless.

In the case of bipolar electrodes, required for liquid double layer capacitors, Li/SOCl$_2$ cathodes, and H$_2$/H$_3$PO$_4$/O$_2$ fuel cells, preform materials are placed on both sides of a thin metal foil and sintered, as described earlier, so that the metal fibers lock the high surface area carbon fibers to both sides of the electrode foil. The metal foil serves as an electrolyte barrier and an electrode base for connecting external contacts. Metal fibers and the electrode base may be fabricated from the same material, although dissimilar metals can be used provided highly adherent and sinter-bonded contacts can be formed.

The experimental description and results which follow only illustrate this invention and are representative of the methods which may be used and the results which may be obtained, but should not be considered as limiting the invention in any way.

EXPERIMENTAL

Materials

The constituent materials employed during electrode preparation were carbon fibers from Charcoal Cloth, Ltd., 316L stainless steel fibers from Bekaert Steel Wire Corp., cellulose fibers as a mixture of soft and hard woods, and 316L stainless steel foils from Arnold Engineering. Individual carbon fibers were 2-3 microns in diameter but were used in the form of 20 micron diameter bundles up to 5 mm in length containing ca. 30 individual fibers. Stainless steel fibers were 2 microns in diameter and 2 mm in length. Cellulose fibers were 20-30 microns in diameter and varied in length from 100 to 500 microns. The stainless steel foils were 5 microns in thickness.

Fiber Preparation

Before the various fiber materials could be combined into a paper preform, the carbon and stainless steel fibers required separation and dispersion into a slurry for easy mixing with other materials. In raw form, the carbon fibers were bundled and twisted into strands and woven into charcoal cloth. The "cloth" was dismantled into strands, then cut into 0.5 cm sections to allow for dispersion of individual fiber bundles in water. "As received" stainless fibers were coated with polyvinyl alcohol (PVA) type Mowiol 4-88, which was utilized during sizing and cutting prior to shipment. PVA was removed by repeated rinsing of these fibers in distilled water.

Formation of Paper Preform

Since physical mixtures of metals and carbon fibers are not mechanically stable, cellulose fibers were employed as a binder to form paper preforms. The paper preforms used in electrode preparation were processed according to TAPPI Standard 205 using Noran equipment. The pretreated carbon and stainless steel fibers along with cellulose fibers were agitated at 50 Hz in 1 liter of water for five to twenty minutes. The dispersed fiber mixture was then collected on a sheet mold (200 cm$^2$) to form the wet paper composite preform. The preform was pressed at ca. 400 kN/m$^2$ and allowed to dry in air at room temperature.

Assembly of Electrode Preforms

Figure 2:
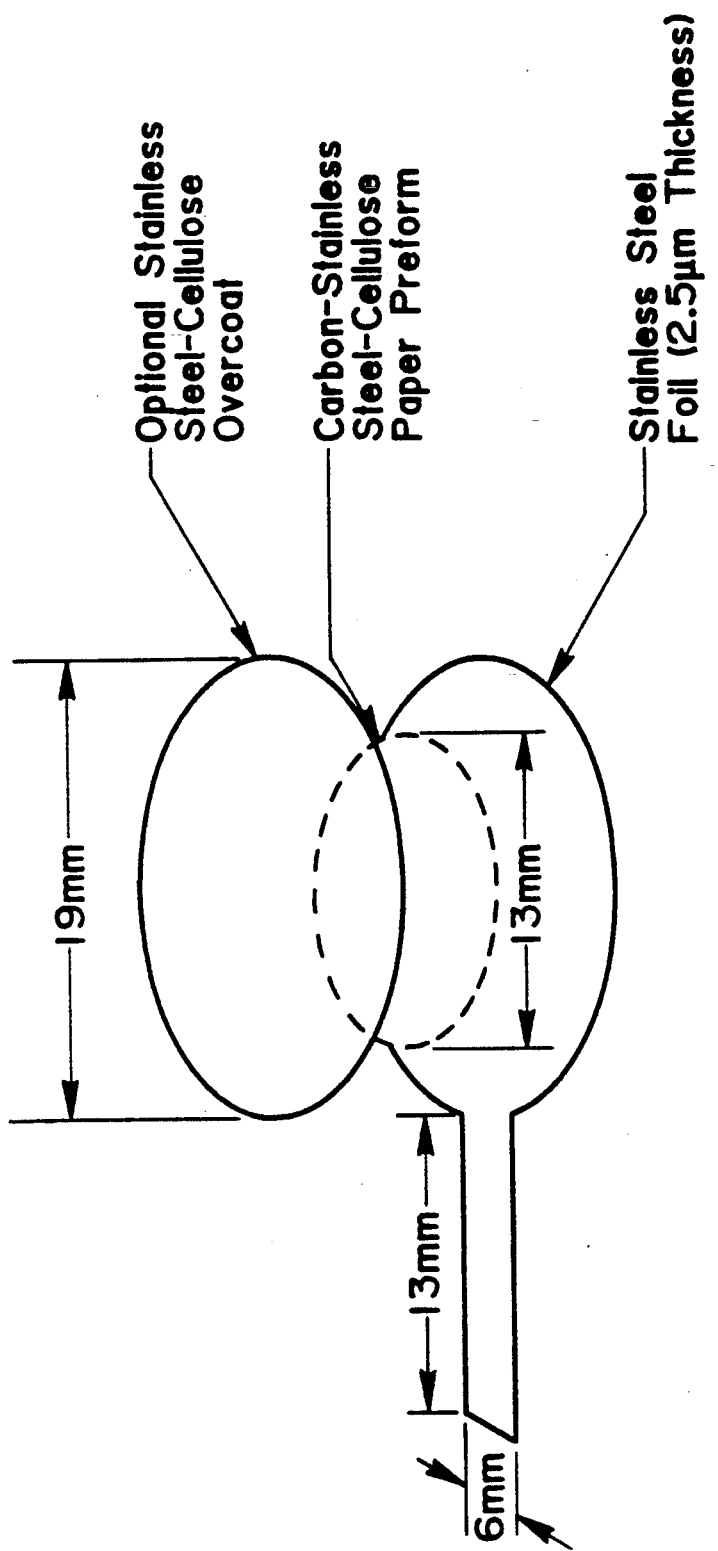
FIG. 2 depicts the assembly of paper preforms into electrode preforms prior to sintering.

The carbon-stainless steel-cellulose composite papers (i.e., paper preforms) and stainless steel foils were cut into circular disks with diameters of 13 and 19 mm respectively, and assembled by layer as shown in FIG. 2. In most cases, an optional 19 mm diameter sheet of stainless steel-cellulose paper preform was placed on top of each side of the composite structure to serve as a protective layer as shown in FIG. 2.

The composition of the composite paper preforms used in electrode fabrication and composite preparation whose results are reported below was 50% carbon (1.0 gm), 25% stainless steel (0.5 gm), and 25% cellulose (0.5 gm). The protective overlayer consisted of 50% stainless steel (0.5 gm) and 50% cellulose (0.5 gm).

Sintering of Electrode Preforms

The layered electrode preform shown in FIG. 1 was placed between two quartz plates (20×30 mm), which were held in place by a quartz clip. The sample was placed in a controlled atmosphere quartz U-tube reactor (25 mm diameter) for heat treatment. The sintering reactor was equipped with flexible gas lines to facilitate movement of the reactor into and out of the vertical sintering furnace (Heviduty, 10 A, 1150 W). Sintering was performed in a reducing atmosphere of $H_2$ with a flow rate of 10–100 cc/min (STP) and total pressure of 101 kPa. Gases were supplied by Liquid Air with purities of 99.995% for $H_2$. Gas flow was monitored using a Linde Model FM-4550 flow controller.

The feed gas mixture was passed over Cu turnings at ca. 500K to remove background CO, $CO_2$, $O_2$ and $H_2O$ and then passed through a molecular sieve trap immersed in a liquid $N_2$ trap to further remove background condensibles. The sintering reactor was passivated with feed gas for a minimum of three hours prior to reaction. The sintering furnace was preheated to 1423K prior to beginning each experiment. The reactor was then introduced into the furnace causing a rapid cooling of the furnace to ca. 1400K. The experimental temperature was typically reached in 5–7 min followed by sintering at the desired temperature. The sintering reactor was quenched by rapidly removing it from the furnace.

Sample Analysis

The amount of carbon retained in the electrode after sintering was estimated from weight change measurements. These measurements were obtained on a Sartorius Model R 160 D semimicro balance with a precision of 0.02 mg.

Volumetric $N_2$ B.E.T. surface area measurements were performed to determine whether the high surface area characteristics of the carbon had been retained. Measurements were taken of virgin charcoal cloth before paper preform preparation and of composite electrodes after sintering. The B.E.T. apparatus employed was a high-vacuum Pyrex design with a base pressure of $4 \times 10^{-2}$ Pa. To minimize background impurities, high-vacuum greaseless stopcocks (Ace Glass) were used to manipulate gas storage and dosage. Experimental pressures were monitored within 1.3 Pa using a Texas Instruments precision manometer (Model 145) employing a fused-quartz Bourdon capsule. Samples were pretreated by heating in vacuum at 473K for a minimum of 2 hrs to remove species such as water from the sample. For each experiment performed, a minimum of four data points were collected over the pressure range of 5.1 to 30 kPa.

The surface compositions of stainless steel foils in the sintered composite were determined using X-ray photoelectron spectroscopy (XPS). XPS analysis was performed using a Leybold-Heraeus LHS-10 spectrometer utilizing MgK$\alpha$ X-rays. The sample was exposed to air for ca. 100 hours before measurements were performed, allowing the surface to oxidize. Analysis was performed at 300K under a vacuum of $1.3 \times 10^{-6}$ Pa. Surface compositions were calculated on the basis of measured peak area ratios normalized with respect to the appropriate cross sections, inelastic electron escape depths, and spectrometer sensitivity factors.

Scanning electron microscopy (SEM) was utilized to observe the degree of intermixing of the constituent fibers and sintering behavior. SEM micrographs were collected on an ISI Model 5540 scanning electron microscope at 5 kV beam energy.

RESULTS

Table I shows carbon retention and sintering results for several sintering conditions.

Retention of Carbon

The amount of carbon retained in the sintered composite matrix was determined by weight change measurements with the assumption that the metal weight would not change during sintering and that all cellulose would be converted to gaseous products. Separate experiments verified that the weight of retained cellulose after exposure to hydrogen at 1323K was negligible. At these conditions, the weight change of stainless steel was not detectable. Based on carbon retention measurements, "optimal sintering" determined by the percentage of initial carbon remaining in the sintered electrode, was achieved at 1423K in $H_2$ for 2.5 minutes. Gas flow of the $H_2$ was maintained at 10 cc/min (STP) with a total pressure of 101 kPa. For these optimal sintering conditions, carbon retentions of >98% were attained. Results of selected sintering experiments are shown in Table I.

TABLE I

| | Carbon Retention as a Function of Sintering Conditions | | | |
|---|---|---|---|---|
| Experiment | Temperature (K) | Time (min) | Percentage of Initial Carbon Retained (%) | Degree of Sintering |
| A | 1323 | 10 | 97.3 | G |
| B | 1323 | 5 | ND | NS |
| C | 1373 | 5 | 97.5 | G |
| D | 1373 | 2.5 | ND | NS |
| E | 1423 | 2.5 | 98.3 | G |
| F | 1423 | 1.5 | ND | NS |

G - Good, appeared structurally stable
ND - Not Determined
NS - Not Sintered, no structural integrity

B.E.T. Surface Area

Of equal importance to the retention of carbon is the requirement that carbon retains its high surface area structure after sintering. Volumetric B.E.T. measurements showed a surface area of ca. 760 m$^2$/gm of carbon for the sintered composite electrode structure compared to ca. 790 m$^2$/gm for virgin charcoal cloth.

Surface Composition

XPS measurements of stainless steel foils that had undergone sintering at the conditions of Experiment H in Table I showed that iron was the most abundant metallic surface species. The surface abundance of iron, chromium, and nickel were investigated. The peak shapes and locations obtained are cosistent with those reported for iron (+3) oxide ($Fe_2O_3$) and chromium (+3) oxide ($Cr_2O_3$) (21). $Fe_2O_3$ was found to be 1.8 times more plentiful than $Cr_2O_3$ on the surface. No nickel oxide (NiO) was detected. Results for the bulk and surface compositions of sintered 316 L stainless steel foils are presented in Table II.

TABLE II

| | Bulk and Surface Composition of Stainless Steel Type 316L Foil. | | |
|---|---|---|---|
| | Bulk Composition (atomic %) | Surface Composition (atomic %) | Heat of Sublimation (kJ/mol) |
| Chromium | 17 | 35 | 396 |
| Iron | 71 | 65 | 416 |

TABLE II-continued

| Bulk and Surface Composition of Stainless Steel Type 316L Foil. | | |
|---|---|---|
| Bulk Composition (atomic %) | Surface Composition (atomic %) | Heat of Sublimation (kJ/mol) |
| Nickel 12 | ND | 429 |

ND - Not Detected by XPS

Composite Matrix Structure

Figure 3:
FIG. 3 is a photomicrograph of a stainless steel-cellulose composite paper before sintering, where the stainless steel fibers are 2 microns in diameter.
Figure 4:
FIG. 4 is a photomicrograph of a stainless steel-carbon-cellulose composite paper before sintering; stainless steel fibers are 2 microns in diameter.

The degree of intermixing of the fibers in the composite electrode matrix was investigated using SEM. FIGS. 3 and 4 show micrographs of the stainless steel-cellulose and stainless steel-carbon-cellulose composite paper preforms, respectively, prior to sintering. The degree of interconnectedness of the metal and the carbon fibers in the two paper preforms is clearly shown in the micrographs.

Figure 5:
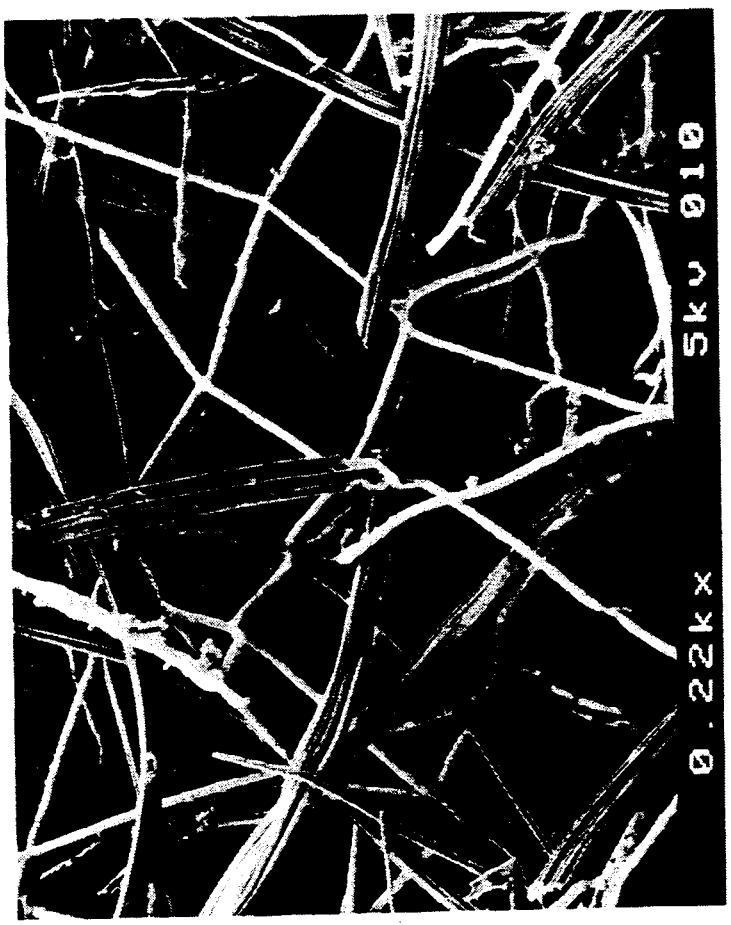
FIG. 5 is a photomicrograph of the stainless steel-carbon composite matrix after sintering the composite paper of FIG. 4 at conditions of Experiment E in Table 1.
Figure 6:
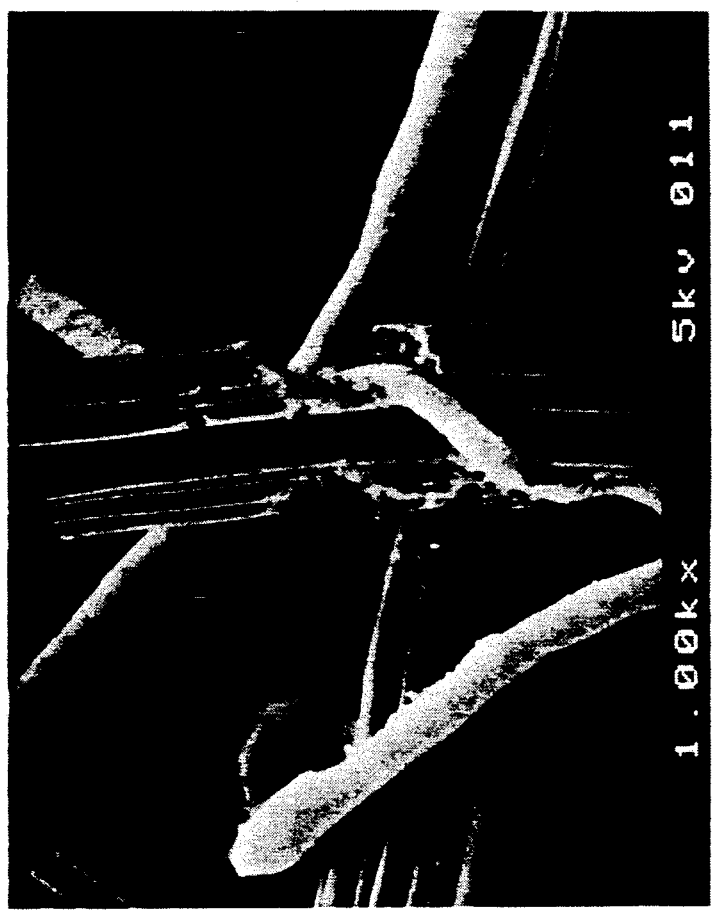
FIG. 6 is a photomicrograph of the stainless steel-carbon composite of FIG. 5 at higher magnification showing intimate contacting of metal and carbon fiber after sintering.
Figure 7:
FIG. 7 is a photomicrograph at still higher magnification of a metal-metal joint after sintering.

FIG. 5 shows the metal-carbon composite matrix after sintering following the conditions of Experiment E in Table I. No cellulose appears in the structure and the interwoven framework of the sintered composite is evident. The intimate contacting of stainless steel and carbon fibers can be seen in FIG. 6. FIG. 7 shows the degree of metal-metal sintering which occurs in the sintered matrix. This sintering appears responsible for the electrode's structural integrity and electrical conductivity.

What is claimed is:

1. A composite comprising a matrix consisting essentially of carbon fibers interlocked in a network of fused metal fibers.

2. The composite of claim 1 where the composite contains from about 1% to about 98% by weight of carbon fibers.

3. The composite of claim 1 where the carbon fibers have a diameter from about 20 nm to about 1 mm.

4. The composite of claim 1 where the carbon fibers have a surface area between 1 and about 1500 square meters per gram.

5. The composite of claim 4 where the carbon fibers have a surface area between about 50 and 1350 square meters per gram.

6. The composite of claim 5 where the carbon fibers have a surface area between about 250 and about 1000 square meters per gram.

7. The composite of claim 1 further characterized in having a surface area from about 0.001 to about 1350 square meters per gram.

8. The composite of claim 1 where the metal fibers have a diameter from about 1 to about 10 microns.

9. The composite of claim 1 containing from about 20 to about 98% carbon fibers.

10. The composite of claim 1 where the metal is selected from the group consisting of aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, beryllium, iridium, silicon, and combinations thereof.

11. The composite of claim 1 where the metal is conducting alloy.

12. The composite of claim 11 where the conducting alloy is selected from the group consisting of constantan, hastelloy, nichrome, inconel, monel, carpenter's metal, stainless steels, other steels, and other iron alloys.

13. The composite of claim 12 where the conducting alloy is a stainless steel.

14. An electrode comprising a composite bonded to an electrically conducting material, where the composite comprises a matrix consisting essentially of carbon fibers interlocked in a network of fused metal fibers.

15. The electrode of claim 14 where the composite contains from about 1 to about 98% by weight of carbon fibers.

16. The electrode of claim 14 where the carbon fibers have a diameter from about 20 nm to about 1 mm.

17. The electrode of claim 14 further characterized in having a surface area from about 0.001 to about 1350 square meters per gram.

18. The electrode of claim 14 where the carbon fibers have a surface area between 1 and about 1500 square meters per gram.

19. The electrode of claim 18 where the carbon fibers have a surface area between about 50 and 1350 square meters per gram.

20. The electrode of claim 19 where the carbon fibers have a surface area between about 250 and about 1000 square meters per gram.

21. The electrode of claim 14 where the metal fibers have a diameter from about 1 to about 14 microns.

22. The electrode of claim 14 containing from about 20 to about 98% carbon.

23. The electrode of claim 14 where the metal is selected from the group consisting of aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, beryllium, iridium, silicon, and combinations thereof.

24. The electrode of claim 14 where the metal is a conducting alloy.

25. The electrode of claim 14 where the conducting alloy is selected from the group consisting of constantan, hastelloy, nichrome, inconel, monel, carpenter's metal, stainless steels, other steels, and other iron alloys.

26. The electrode of claim 25 where the conducting alloy is a stainless steel.

27. The electrode of claim 14 where the electrically conducting material is a second metal and the composite is bonded to said second metal by sintering.

* * * * *